2,959,278

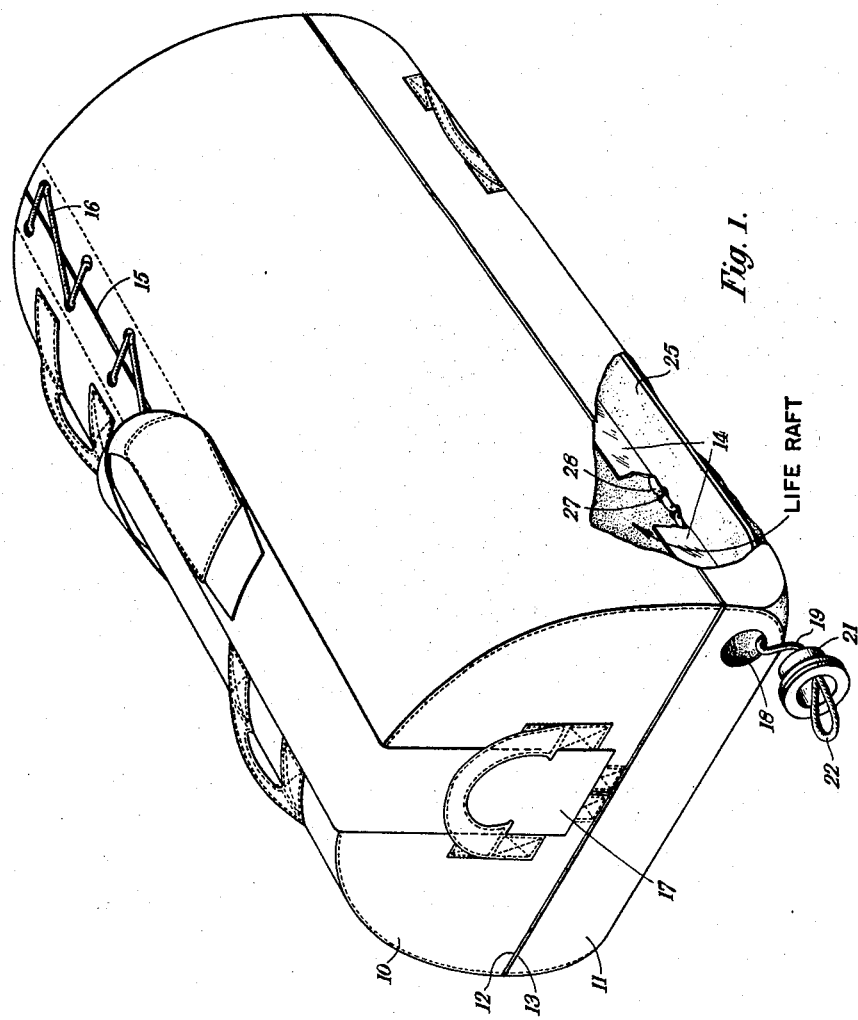
Nov. 8, 1960     S. MITCHELL ET AL     2,959,278
VALISE CONTAINING A SELF-INFLATING ARTICLE
Filed Oct. 15, 1956     2 Sheets-Sheet 1
SIDNEY MITCHELL and
DAVID VERNON EDWARDS
BY Cushman, Darby & Cushman
ATTORNEYS Nov. 8, 1960 S. MITCHELL ET AL 2,959,278
VALISE CONTAINING A SELF-INFLATING ARTICLE
Filed Oct. 15, 1956 2 Sheets-Sheet 2
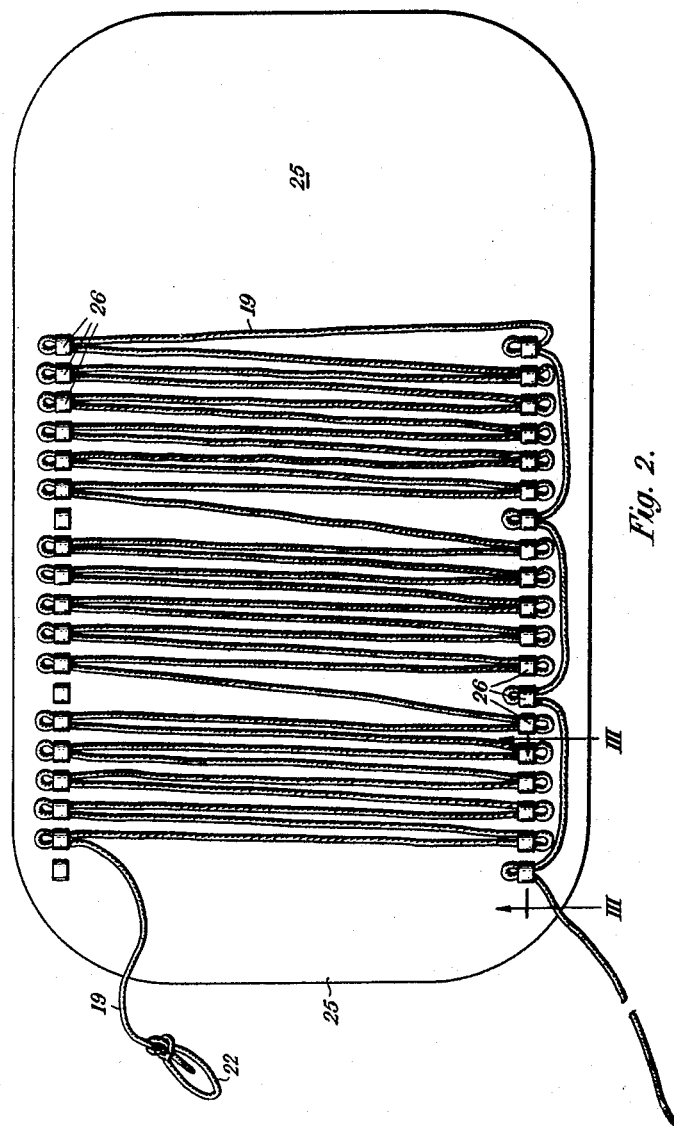
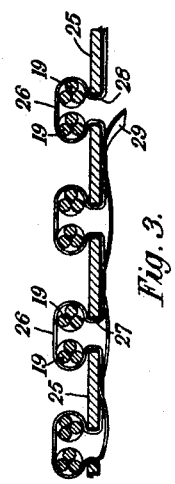
INVENTORS
SIDNEY MITCHELL,
DAVID VERNON EDWARDS

United States Patent Office 2,959,278
Patented Nov. 8, 1960

VALISE CONTAINING A SELF-INFLATING ARTICLE

Sidney Mitchell, Farncombe, and David Vernon Edwards, Godalming, England, assignors to R.F.D. Company Limited, Godalming, England, a British company Filed Oct. 15, 1956, Ser. No. 616,032

Claims priority, application Great Britain Oct. 14, 1955

10 Claims. (Cl. 206—46)

The invention relates to improvements in valises and has for an object to provide, in a valise such as is used to contain air/sea rescue equipment, an inflatable dinghy or like flotation gear, improved means whereby the valise is capable of breaking open automatically to release its contents at the time desired, e.g. when the automatic self-inflation apparatus of the dinghy or the like is brought into operation, it being essential that the valise should be water-tight, to ensure full protection for the contents against ingress of moisture, gas or vapour.

A further object of the invention is to provide an improved constructional form and assembly of valise in which the usual static line or operating cord for setting in action the apparatus by which the dinghy or the like is inflated in an emergency is stowed inside the valise so as to prevent it deteriorating or being tampered with.

According to the invention a valise such as is used to contain air/sea rescue equipment, an inflatable dinghy or like flotation gear, comprises a waterproof fabric container having a slit therein extending at least partially around it and through which the dinghy or like gear can be released, the edges of the fabric on either side of said slit being joined together by a strip of waterproof fabric firmly attached to said edges and which is of such strength characteristics as to be capable of rupturing longitudinally to break the joint when subjected to the pressure within the valise of the inflating dinghy or like gear.

Further according to the invention a valise such as is used to contain air/sea rescue equipment, an inflatable dinghy or like flotation gear, comprises a container made of waterproof fabric and having two complementary portions joined together along their meeting edges, said joint being made of a strip of waterproof fabric which is firmly attached to said edges and which is of such strength characteristics as to be capable of rupturing longitudinally to break the joint when subjected to the pressure within the valise of the inflating dinghy or the like.

According to a further feature of the invention the said container encloses a carrier on which a cord for operating the inflation apparatus of said equipment is flaked or coiled, the arrangement being such that the cord is capable of being drawn out taut through an aperture in the container without risk of entanglement, the joint between the edge of said aperture and said cord normally being sealed.

In order that the invention may be more readily understood reference will be made to the accompanying drawings which illustrate by way of example, a preferred embodiment thereof.

In the drawings:

Fig. 1 is a perspective view of the valise partly broken-away to show a section of the interior.

Fig. 2 is an underside view of the board or partition on which a painter or like cord is flaked in readiness for running out, and Fig. 3 is a section on the line III—III of Fig. 2 showing a method of retaining the painter in a flaked condition.

Referring to Fig. 1 the two complementary portions 10 and 11 of the valise are joined to each other along their meeting edges 12 and 13 by a rupturable fabric strip 14. Preferably the strip 14 is applied to the joint from the inside of the valise but it may if desired also be applied to the outside of the joint along the length thereof or at predetermined sections such as at the corners of the valise.

In the preferred embodiment illustrated the upper portion 10 of the valise is provided with a slit-aperture 15 through which the collapsed dinghy or other equipment is inserted and packed in the valise, the edges of such aperture 15 after completion of the packing operation, being laced together by a cord 16 and permanently sealed by a strip of fabric 17.

All seams and corners of the valise are sealed and the aperture 18 through which passes the usual static line or operating cord 19 for the inflation gear may be closed by a plug 21 having a watertight fit on said cord and which can be removed to permit operation of the cord. Alternatively the aperture 18 may be closed by a stuck-on patch (not shown) of waterproof fabric. In the latter case the patch may be made of soft rubber which either stretches or tears to allow said cord to be withdrawn.

In operation in an emergency the valise containing a dinghy or the like packed therein, is thrown overboard whilst the loop 22 on the cord 19 is retained. The cord 19 which is stowed in the valise in a manner hereinafter described, runs out of the aperture 18 and on tautening its inner end which is attached to the inflation apparatus, operates the valve thereof to inflate the dinghy or the like. The pressure of the inflating dinghy against the interior of the valise causes the strip 14 to rupture longitudinally to break the joint between the portions 10 and 11 of the valise and permit the dinghy to be released.

In an alternative embodiment of the invention, not illustrated, the valise is of a single component having two apertures of which one is closed by a strip of adhesive waterproof fabric applied as aforesaid and adapted to rupture in the conditions described, whilst the second aperture serves merely for the initial storage of the contents of the valise and is therefore permanently sealed. It will also be understood that in suitable cases the rupturable fabric strip may be applied to the aperture used for storage, in which case a single aperture will suffice.

In an alternative arrangement the slit in the fabric through which the dinghy or the like is ejected does not penetrate to the full thickness of the fabric but forms a rupture line which tears at the same time as the rupturable strip 14.

Figs. 2 and 3 of the drawings illustrate the manner in which the operating cord 19 is stowed in the valise. In the embodiment illustrated the valise is made with a rectangular base and the lower portion 11 shown in Fig. 1 is arranged to receive a loose rectangular board 25. The dinghy or other equipment will be stowed in the space above the board 25, whilst the operating cord 19 is led directly from the point of its attachment to the inflation apparatus to the underside of the board.

The length of the cord 19 which may be sufficient to permit it to be used as a painter for attaching a dinghy to a vessel or aircraft in distress, is coiled or flaked beneath the board as shown in Fig. 3 and the end having the loop 22 is passed through the aperture 18 (see Fig. 1) in the side of the valise.

In the preferred embodiment the coils or flaked parts of the cord 19 are detachably mounted by means of india-rubber loops 26, upon the underside of the board 25 in such manner as to ensure that each coil or flaked part of the cord is drawn out in turn. As will be seen from Fig. 2 the cord is flaked so that certain loops 26 are left available for receiving the inner end of the cord 19 which can be attached to the inflation apparatus.

The rubber loops 26 are located in two rows of holes 27 formed in the board near two opposite edges thereof. Each row of loops is preferably formed from a continuous length of india-rubber strip 28, bights of which are inserted through the holes 27 as shown in Fig. 3, the end 29 of the strip 28 being secured by tucking it under other parts of the strip in between the holes 27.

In an alternative arrangement the loops 26 may be formed of thread or the like which will part when the cord 19 is drawn out.

In order to facilitate installation of the equipment on board a craft the cord may be marked with a number of labels indicating the amount of cord remaining in the valise. Thus in aircraft and ships of low freeboard the cord may be shortened to the required length.

What we claim as our invention and desire to secure by Letters Patent is:

1. A valise for containing a self-inflating article and the major portion of a long actuating cord comprising a water-proof fabric container, said container defining a slit therein extending at least partially around said container and through which an inflatable article in the container can escape after partial inflation, a strip of water-proof fabric sealed to the respective edges of the fabric on either side of the slit and being rupturable upon subjection to the pressure of the article being inflated within said container, said rupturable strip having a strength to resist rupture in a direction transversely thereof which is substantially less than that of the fabric of the remainder of the container, said container defining an aperture through which the actuating cord may pass, removable sealing means for sealing this aperture when the cord is extending through it, said container further defining a second slit through which an uninflated inflatable article may be introduced therewithin, eye hole means formed on the respective edges of the fabric on either side of the second slit, lacing means woven through said eye hole means and operable to draw the respective edeges of the second slit together, and waterproof means disposed over said lacing means and said eye hole means, and contacting the respective edges of the second slit, to seal the same, said means having a total strength to resist rupture in a direction transversely thereof which is at least substantially as great as that of the fabric of the container.

2. The valise as claimed in claim 1 wherein the removable sealing means for the aperture comprises a plug attachable to the actuating cord.

3. A valise for containing a self-inflating article and the major portion of a long actuating cord comprising a water-proof fabric container, said container defining a slit therein extending through a major portion of the periphery of said container and through which an inflatable article in the container can escape after partial inflation, a strip of water-proof fabric sealed to the respective edges of the fabric on either side of the slit and being rupturable upon subjection to the pressure of the article being inflated within said container, said rupturable strip having a strength to resist rupture in a direction transversely thereof which is substantially less than that of the fabric of the remainder of the container, said container defining an aperture through which the actuating cord may pass, removable sealing means for sealing this aperture when the cord is extending through it, said container further defining a second slit through which an uninflated inflatable article may be introduced therein, closure means including means to draw the respective edges of the second slit together, and waterproof means disposed over said closure means and contacting the respective edges of the said slit to seal the same, said closure means having a total strength to resist rupture in a direction transversely thereof which is at least substantially as great as that of the fabric of the container.

4. The combination comprising a self-inflating article, a long actuating cord having one end connected thereto, a water-proof fabric container, said article and a major portion of said cord being disposed within said container, said container defining a slit therein extending through a major portion of the periphery of said container and through which the inflatable article in the container can escape after partial inflation, a strip of water-proof fabric sealed to the respective edges of the fabric of the container on either side of the slit and being rupturable upon subjection to the pressure of the article being inflated within said container, said rupturable strip having a strength to resist rupture in a direction transversely thereof which is substantially less than that of the fabric of the remainder of the container, said container having an aperture therein, a portion of said cord extending therethrough, and removable sealing means for sealing this aperture when the cord is extending through it, said container further defining a second slit for loading the container with the self-inflating article, closure means including means to draw the respective edges of the second slit together, and water-proof means disposed over said closure means and contacting the respective edges of the said slit to seal the same, said closure means having a total strength to resist rupture in a direction transversely thereof which is at least substantially as great as that of the fabric of the container.

5. The combination comprising a self-inflating article, a long actuating cord having one end connected thereto, a water-proof fabric container, said article and a major portion of said cord being disposed within said container, said container defining a slit therein extending at least partially therearound and through which the inflatable article can escape after partial inflation, a strip of water-proof fabric sealed to the respective edges of the fabric of the container on either side of the slit and being rupturable upon subjection to the pressure of said article being inflated within said container, said rupturable strip having a strength to resist rupture in a direction transversely thereof which is substantially less than that of the fabric of the remainder of the container, said container having a second aperture therein, a portion of said cord extending therethrough, and removable sealing means closing said last mentioned aperture, said container defining a third aperture for loading the container with the self-inflating article, means for closing said third aperture, said closure means having a strength to resist rupture in a direction transversely thereof which is at least substantially as great as that of the fabric of the container, said means including a permanent watertight seal, a carrier disposed within said container, said cord being flaked upon said carrier, and means on said carrier for releasably fixing the coils of the cord in position.

6. The combination of claim 5, said carrier comprising a planar element between said inflatable article and one surface of the container, said releasably fixing means being located on the side of said planar element furtherest from said inflatable article.

7. The combination of claim 6 in which the means for releasably fixing said coils comprises a plurality of spaced rows of elastic loops fixed to said carrier.

8. A valise for containing a self-inflating article and the major portion of a long actuating cord comprising a water-proof fabric container, said container defining a slit therein extending through a major portion of the periphery of said container and through which an inflatable article in the container can escape after partial inflation, a strip of water-proof fabric sealed to the respective edges of the fabric on either side of the slit and being rupturable upon subjection to the pressure of the article being inflated within said container, said rupturable strip having a strength to resist rupture in a direction transversely thereof which is substantially less than that of the fabric of the remainder of the container, said container defining a second aperture for loading the container with the self-inflating article, means for closing said second aperture, said closure means having a strength to resist rupture in a direction transversely thereof which is at least substantially as great as that of the fabric of the container, said means including a permanent watertight seal, a carrier disposed within said container, said cord being flaked upon said carrier, and means on said carrier for releasably fixing the coils of the cord in position.

9. The combination of claim 8, said carrier comprising a planar element between said inflatable article and one surface of the container, said releasably fixing means being located on the side of said planar element furtherest from said inflatable article.

10. The combination of claim 9 in which the means for releasably fixing said coils comprises a plurality of spaced rows of elastic loops fixed to said carrier.

References Cited in the file of this patent

UNITED STATES PATENTS

| | | |
|---|---|---|
| 590,421 | Manley | Sept. 21, 1897 |
| 2,171,718 | Vogt | Sept. 5, 1939 |
| 2,402,093 | Schermuly et al. | June 11, 1946 |
| 2,444,859 | Sturtevant | July 6, 1948 |
| 2,609,549 | Krupp | Sept. 9, 1952 |

FOREIGN PATENTS

| | | |
|---|---|---|
| 753,898 | Great Britain | Aug. 1, 1956 |